(12) United States Patent
Ashbrook et al.

(10) Patent No.: US 8,422,406 B2
(45) Date of Patent: Apr. 16, 2013

(54) IDENTIFYING CALLERS IN TELECOMMUNICATIONS NETWORKS

(75) Inventors: David Ashbrook, Newbury (GB); David Pollington, Newbury (GB)

(73) Assignee: Vodafone Group PLC, Newbury Berkshire (GB)

( * ) Notice: Subject to any disclaimer, the term of this patent is extended or adjusted under 35 U.S.C. 154(b) by 1306 days.

(21) Appl. No.: 12/218,815

(22) Filed: Jul. 18, 2008

(65) Prior Publication Data

US 2009/0034704 A1 Feb. 5, 2009

(30) Foreign Application Priority Data

Jul. 19, 2007 (GB) .................................. 0714131.0

(51) Int. Cl.
*H04L 12/16* (2006.01)
*H04Q 11/00* (2006.01)
*H04M 3/42* (2006.01)

(52) U.S. Cl.
USPC ....................................... 370/265; 379/204.01

(58) Field of Classification Search .................. None
See application file for complete search history.

(56) References Cited

U.S. PATENT DOCUMENTS

| 6,304,648 B1 | 10/2001 | Chang |
| 6,457,043 B1 | 9/2002 | Kwak et al. |
| 2003/0125954 A1 | 7/2003 | Bradley et al. |
| 2005/0018828 A1 | 1/2005 | Nierhaus et al. |
| 2005/0135583 A1 | 6/2005 | Kardos |
| 2005/0135613 A1* | 6/2005 | Brandenburg et al. ......... 380/43 |
| 2005/0141704 A1* | 6/2005 | Van Der Veen ................. 380/28 |
| 2005/0243168 A1* | 11/2005 | Cutler ......................... 348/14.12 |
| 2006/0174348 A1* | 8/2006 | Rhoads et al. ................... 726/26 |
| 2007/0019621 A1* | 1/2007 | Perry et al. ..................... 370/352 |
| 2007/0025538 A1* | 2/2007 | Jarske et al. ............. 379/202.01 |
| 2007/0253348 A1* | 11/2007 | Sammarco .................... 370/260 |

FOREIGN PATENT DOCUMENTS

| EP | 1 292 090 A1 | 3/2003 |
| GB | 2416955 A * | 2/2006 |
| WO | WO 2004/006475 A2 | 1/2004 |
| WO | WO 2005/119655 A1 | 12/2005 |
| WO | WO 2005/119985 A1 | 12/2005 |
| WO | WO 2007083952 A1 * | 7/2007 |

* cited by examiner

*Primary Examiner* — Fan Tsang
*Assistant Examiner* — Jeffrey Lytle
(74) *Attorney, Agent, or Firm* — Muirhead and Saturnelli, LLC

(57) ABSTRACT

A system and method that allows different participants in a conference call to be identified at a receiving terminal includes watermarking speech data when the uplink information from the terminals of the participants is received at the telecommunications network. The speech data is then combined at a conference bridge in the network and is transmitted in the downlink to the receiving terminal. The receiving terminal uses the watermarks to identify from which of the participants the received speech data originated and is operable to reproduce the speech data from the respective participants at different positions in a 2D or 3D space to help the user of the receiver terminal to identify contributions made by the respective participants.

30 Claims, 2 Drawing Sheets

IDENTIFYING CALLERS IN TELECOMMUNICATIONS NETWORKS

TECHNICAL FIELD

This application relates to calls in telecommunication networks and more particularly, but not exclusively, to conference calls in telecommunication systems having a plurality of transmitter/receiver units, where compression and/or decompression of data relating to the call may be performed.

BACKGROUND OF THE INVENTION

In a conference call several users will dial into a conferencing bridge system (even if this is masked and they do not think that they are). This bridge will merge the incoming speech data from all lines into a single downlink and push this back to the remaining users on the call. Thus, conventionally speech data overlaps and cannot be separated once at the receiving terminal. Further, the speech data within each uplink will be bandwidth limited and compressed (using standard processes as would be performed with any GSM/3G call).

Conference calling in such telecommunication systems allows multiple callers in different locations to interact in a single voice call. A problem with such conference calls is differentiating between participants using a single mono audio output of the type that is normal with mobile handsets. This is exacerbated by network bandwidth limitations in such conference calls as well as signal compression that results in many of the subtle clues used by a person to recognise another person's voice being lost. In a conference call human voice is bandwidth limited to 4 kHz and all incoming lines are overlapped to create a single downlink to a single speaker. It is therefore difficult to differentiate between users, or decide when a new user begins to speak, as well as knowing how many people are involved in the call and remembering their names.

Adding spatial information to each user within a conference call could help users differentiate between users on the call. However, because uplinked lines are merged into one downlink, and compressed and bandwidth limited, this spatial information cannot conventionally be transferred across the mobile network.

It has been suggested in US2003/0044002 A1 to create spatially resolved audio signals for a listener as representative of one or more callers. In this way, audio signals appear to emanate from different spatial locations around the listener. A tag identifying a caller is transmitted in the data signal together with the speech data. The tag is separate from the speech data; the tag is present either before or after the speech data in the data signal.

GB 2416955 discloses an arrangement to reduce bandwidth required to relay signals simultaneously from all participants in the conference call.

SUMMARY OF THE INVENTION

According to the system described herein, a method of performing a call in a telecommunication system having a plurality of transmitter/receiver units registered with a telecommunications network may include receiving in the network an uplink signal representing detected sound from an originating unit, generating a downlink signal by encoding said uplink signal such that data indicative of a tag corresponding to the originating unit is embedded in a payload of said downlink signal, which payload conveys the detected sound, receiving the downlink signal, and extracting said embedded tag from the downlink signal in order to identify the originating unit corresponding to the tag.

In an example embodiment of the system described herein, the users within a call may be "tagged" in a way that can cross the network without degradation and to then spatialize their voice using a software client on the handset. Since all the user voices may be merged into one, a method of tagging voices and extracting them after merging and compression may be used.

In an embodiment, embedding a watermarked tag e.g. a basic binary number, or other identifier into the speech data of incoming calls may allow the users to be distinguished. Embedding a tag into the speech data of uplinked conference calls by use of compression resistant watermarking technology may allow each individual incoming line to the conference bridge to be "tagged" and assigned to a particular user.

When arriving at the conference bridge, each incoming line may be merged into one overlapping downlink and pushed back to all other users on the call in the embodiment. This would conventionally impose server difficulties in allowing individual voices to be extracted and for the positioning process. However, due to the embedded watermarking of the embodiment, individuals may be identified and extracted real time, allowing the receiving terminal to manipulate individual lines, for example by 3D spatializing them.

Multiple lines may be tagged using watermarking technology, compressed, merged and limited during transfer throughout the network, and then to the individual speech data may be extracted from the merged downlink back to separate lines after compression.

The watermark may be added either in the uplinking terminal using a client or in the network before merging (with the bridge) and at any point of compression (both within the terminal and subsequent PCM conversion within the TRAU in the network) as the watermark should be impervious to this. The watermark may be added before the merge. The compression may be that used within a standard GSM/3G call.

In an embodiment, the tag may be embedded in the payload by watermarking the payload. For example, DC watermarking, phase encoding watermarking, spread spectrum watermarking or echo watermarking may be used.

According further to the system described herein, a method of performing a call in a telecommunications network includes receiving in the uplink, speech data from a first terminal registered with the telecommunications network, receiving in the uplink, speech data from a second terminal registered with the telecommunications network; adding a watermark to the received speech data from the first terminal to generate watermarked speech data of the first terminal, adding a watermark to the received speech data from the second terminal to generate watermarked speech data of the second terminal, generating a downlink signal for a receiving terminal registered with the network including both the watermarked speech data of the first terminal and the watermarked speech data of the second terminal; receiving the downlink signal at the receiving terminal, identifying the watermarked speech data of the first terminal, and identifying the watermarked speech data of the second terminal.

The method according to the system described herein may further include producing at the receiving terminal a spatially resolved audio signal in which the uplink speech data from the first terminal and the uplink speech data from the second terminal are reproduced at distinct locations in a two-dimensional or three-dimensional space.

In various embodiments, the following features may be provided. The downlink may be pushed to all terminals within the call. The spatially resolved audio signal may be generated by stereo panning or by two-dimensional (2D) or three-dimensional (3D) virtualized audio for example. The uplink and/or downlink data may be transmitted in the circuit switched domain or the packet switched domain. Two separate speech lines may be extracted and then spatially resolved.

The caller may be identified in ways other than producing a spatially resolved audio signal. If the voice data have been tagged and then extracted using a client application on the terminal, the terminal may then be aware of how many people are within the call and can spatially resolve them. However, a terminal could also draw a graphical depiction of a room and show a depiction of the users, could list their names, or show their picture when they are talking etc. This may require either further information to be passed via the watermark, or to be tied into other data such as the phone book.

According further to the system described herein, an apparatus for performing a call in a telecommunications network may include an originating unit and/or a receiving unit that receives an uplink signal and/or a signal generator that generates a downlink signal.

In various embodiments, the received uplink signals may each be watermarked. A conference bridge, and/or other signal compression unit, may then compress the watermarked uplink signals and then transmit the compressed watermarked uplink signals on the downlink channel to a receiving unit. The conference bridge and/or network, may bandwidth limit, compress, and merge all uplinks into one downlink that may then be pushed to all other members of the call. Due to the embedded watermarking, speech data from individual terminals sent in the uplink signal can be extracted in real time from the data received by the receiving terminal. The receiving terminal may decompress the downlink channel and then extract the watermarks in order to identify from which terminal the speech data associated with that watermark was transmitted. A positioning algorithm in the receiving terminal can then place speech data from each originating terminal at a particular position in a 2D or 3D space around the user. Alternatively, as mentioned elsewhere herein, once the watermarks are extracted the call participants can be indicated in other ways—e.g. by listing names or drawing a room.

Three-dimensional audio spatialization is one example of an excellent way of improving audio conference intelligibility, especially for mobile telecommunications networks where bandwidth is restricted and sound quality limited. Such a service may be implemented if the tagging of voice data from particular originating units does not consume excessive bandwidth, and also avoids undue implementation cost to either terminal, network or back-end platforms. The tags are such that they make it through the bandwidth limiting and compression.

In an embodiment, 3D audio spatialization may be provided in an audio conference using client-based spatialization without an excessive increase in service bit rate and without noticeably affecting the quality of the speech reproduction.

BRIEF DESCRIPTION OF THE DRAWINGS

Embodiments of the system described herein are discussed in reference to the drawings that are briefly described as follows.

DETAILED DESCRIPTION OF VARIOUS EMBODIMENTS

An embodiment of the system described herein in the circuit switched (CS) domain will initially be described.

Figure 1:
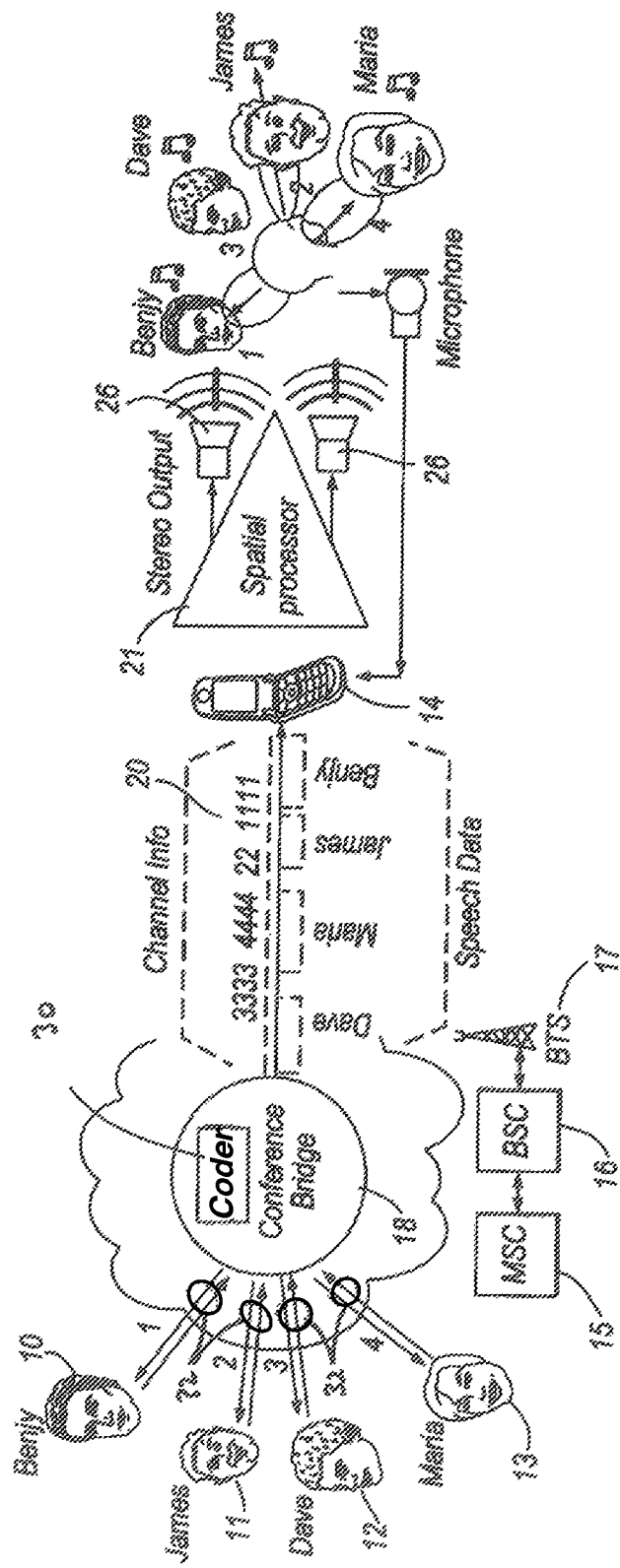
FIG. 1 is a schematic view of a mobile telecommunications network in a conference call configuration with mobile transmitting/receiving units, each unit having a spatial processor according to an embodiment of the system described herein.

Referring first to FIG. 1, the network is a GSM network including a plurality of mobile transmitter/receiver units of which five 10, 11, 12, 13, 14 are shown in FIG. 1. The network may include a mobile switching centre (MSC) 15, a base station controller (BSC) 16 and a plurality of base transceiver stations (BTS), one of which is shown at 17.

The MSC 15 may include a conference bridge 18 that permits the plurality of mobile units 10, 11, 12, 13, 14 to communicate in a single voice (conference) call. Each mobile unit 10, 11, 12, 13, 14 transmits to the MSC 15 via a BTS and BSC in the uplink, a signal 1, 2, 3, 4 that includes a voice component of the user of that mobile. In the CS domain, one downlink and uplink channel between the network and the mobile unit may be maintained at a time. The conference bridge 18 allows the voice components received in the uplink from each mobile unit 10,11,12,13,14 to be combined and transmitted in the downlink as a single CS channel.

Speech may be encoded by a multi-channel variable bitrate audio/speech coder 30 in the conference bridge 18. The coder 30 may produce and/or otherwise generate an optimal bitstream for conveying the speech component to a receiving unit 10, 11, 12, 13, 14 in the downlink channel. For example, the coded signals representing speech may then be fed via a BSC 16 and a BTS 17 to a receiving unit 14. Note that other signal generator and transmitter components may be used in connection with the system described herein. The speech data from each mobile unit 10,11,12,13 may be conveyed in a respective sub-channel of the downlink channel 20. Each sub-channel may include a tagging identifier that identifies the transmitting unit. One sub-channel may be carrying the speech of the current speaker and "silent" sub-channels for each of the other speakers (usually only one participant in the conference call speaks at a time).

The coder 30, and/or other signal compression unit, may compress the speech data from the mobile units 10,11,12,13 using a suitable compression algorithm. GSM compression may be used, or alternatively, or additionally, MP3 or WMA compression may be used, for example.

At the receiving unit 14 the downlink channel may be received and decompressed. The sub-channels and the respective tags associated therewith may then be extracted from the received data. The sub-channels may be passed to a spatial processor 21. The spatial processor 21 may use the tagging identifier and the coded speech signal to generate a analogue spatially resolved audio signal characteristic of the transmitter unit 10, 11, 12, 13 from which the signal 1, 2, 3, 4 emanates. If the receiving unit 14 has stereo loud speakers 26 then the spatial orientation of the signals 1, 2, 3, 4 will be mainly located in front of the person using the receiving unit 14 as seen in FIG. 1, assuming the unit is held in front of the person. Better spatial separation in 3D around the person (that is, in a 3D space around the person) may be obtained using, for example, stereo headphones. Such spatial processors 21 are known and will not be described in further detail.

The analogue spatial audio signal produced at the receiving unit 14 may be a 3-D signal lying in an imaginary sphere around the receiving person. Alternatively, this may be a 2-D signal lying in an imaginary circle around the receiving person. It has been found that, in general, 2-D signals in front of the receiving person are the most easily differentiated since the human body is best able to distinguish sounds over the front hemisphere of the body. The use of a 2-D or 3-D signal allows the user to distinguish more easily between participants and provides a more natural listening environment so reducing listening fatigue. It would also allow louder speakers to be moved further away and to move softer speakers closer. It gives the potential for a large number of conference participants due to the extended sound field and, since no background noise is received, increases the illegibility.

It is possible to use only stereo panning in which the audio signals were chosen from a left ear signal, a right ear signal and a left and right ear signal and possibly mid-left and mid-right signals.

In accordance with an embodiment of the system described herein, the tagging identifiers may each comprise an embedded watermarked tag in the speech data of incoming calls which allows the users to be distinguished. The tags may be added to each incoming uplink channel by watermarking processors 32. The watermarking may be performed prior to compression by the coder 30. The watermarking performed by the watermarking processors 32 may be resistant to the compression process performed by the coder 30, and to the decompression process performed by the receiving mobile unit 14. That is, the watermark tags inserted by the watermarking processors 32 may be recognizable and intelligible by the mobile unit 14 after compression and decompression. The tag may be a basic binary number.

Figure 2:
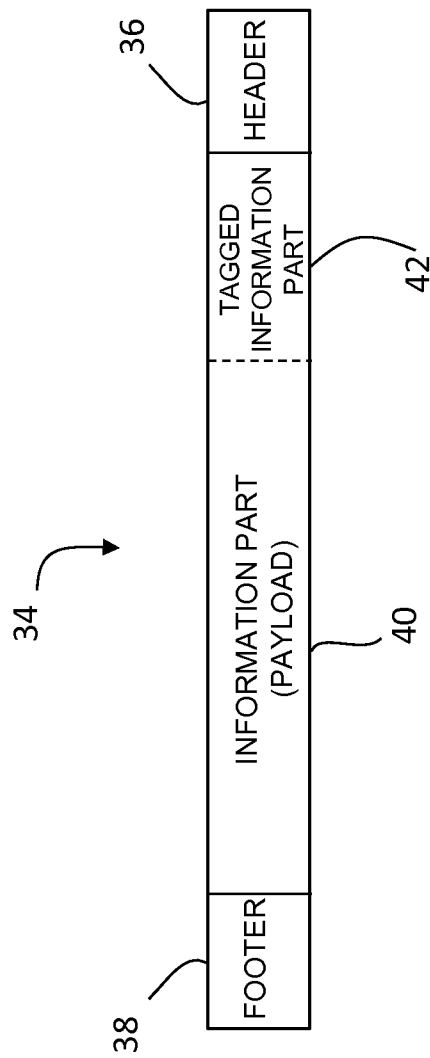
FIG. 2 shows a time frame transmitted in the downlink to a receiving mobile unit according to an embodiment of the system described herein.

FIG. 2 shows a time frame, in accordance with an embodiment of the system described herein, transmitted in the downlink channel to the receiving mobile unit 14. The time frame 34 may comprise a header 36, a footer 38 and an information part (payload) 40. In the illustrated embodiment, the information part 40 may comprise information representing speech data from any of mobile units 10, 11, 12 and 13 that are participating in the conference call. For example, information part 42 may comprise speech data from the mobile unit 10. Embedded within that speech data may be a watermark tag representing the identity of the mobile unit 10.

Embedding a basic binary number into the speech data itself by use of compression resistant watermarking technology provides an advantageous mechanism for each individual incoming uplink channel to the conference bridge 18 to be "tagged" and assigned to a particular user.

As discussed elsewhere herein, when arriving at the conference bridge 18, each incoming line from the mobile units 10,11,12,13 may be merged into one overlapping downlink and pushed back to mobile unit 14 (and to all users on the conference call). This would normally impose difficulties in allowing individual voices to be extracted and for the positioning process. However, due to the embedded water marking, individuals can be identified and extracted real time allowing the positioning algorithm to take each individual and place them in 3D space around the user.

The tagging information may be hidden within the audio data in a format that is inaudible to a listener (i.e. outside the range of human perception), but can be detected and decoded by the receiving mobile unit. This hidden information, or watermark, could be used to communicate not only participant tags, but also identity information and other meta data.

The following water marking schemes may be used, for example.

DC Watermarking Scheme

The DC watermarking scheme may hide watermark data in lower frequency components of the audio signal, which are below the perceptual threshold of the human auditory system. However there are issues as to whether compression algorithms that are based on removing these inaudible parts of audio signals would remove all trace of the watermark.

This DC watermarking scheme has some major limitations with regards to robustness and data density. The robustness of the scheme can be increased somewhat by utilizing longer audio files, by inserting the watermark signal multiple times, which will aid in extraction, and also in error correction if the signal is manipulated.

In order to attain higher hidden data density in the watermarked signal, more advanced techniques may be used such as spread spectrum, phase encoding, or echo hiding. The highest rate and most versatile and reliable watermarking scheme may comprise a combination of all of the above, allowing the software to capitalize on the strengths of each technique when processing the unmarked audio.

Phase Encoding Watermarking

The phase encoding watermarking technique exploits the human auditory system's lack of sensitivity to absolute phase changes by encoding the watermark data in an artificial phase signal.

Phase encoding works by breaking the audio signal into frames, and performing spectral analysis on each frame. Once the spectrum has been computed, the magnitude and phase of consecutive frames are compared, and an artificial phase signal is created to transmit data. The artificial phase is modulated in with the phase from each frame, and the new phase frames are combined to form the watermarked signal.

The modified phase frames can also be smoothed to limit the amount of distortion present in the marked signal, but in minimizing distortion, the data rate of the watermark is constrained respectively.

The phase encoding watermarking technique offers higher data rates over the previous method, averaging from 8 to 32 bits per second; in comparison to DC watermarking that may only offer 11.1 bits per second. This technique is also increasingly effective in the presence of noise.

Spread Spectrum Watermarking

The spread spectrum watermarking technique relies on direct sequence spread spectrum (DSSS) to spread the watermarked signal over the entire audible frequency spectrum such that it approximates white noise, at a power level as to be inaudible. A pseudorandom sequence (chip) is used to modulate a carrier wave which creases the spread signal watermark code. This code is attenuated to a level roughly equal to 0.5% of the dynamic range of the original audio file, before being mixed with the original.

The data rate from this technique is much lower than previous methods, and averages around 4 bits per second. The low data rate is compensated by the robustness of this algorithm due to high noise immunity.

Echo Watermarking

The echo data hiding techniques relies on distorting an audio signal in a way that is perceptually dismissed by the human auditory system as environmental distortion.

The original audio signal is copied into two segments (kernels), one that leads the original signal in time, and one that lags. Each kernel represents either a zero or a one bit for watermark data transmission. The bit stream of watermark data is used to mix the two kernels together. The signals are mixed with gradually sloped transitions to reduce distortion.

Some alternative embodiments will now be described.

It is possible that the systems described above could be implemented with a CS uplink and a packed switched (PS) downlink, or with a PS uplink and downlink.

In an embodiment, each unit may be a mobile telecommunications device. However, it should be appreciated that the units need not be mobile telecommunications devices; one or more of the units may be fixed terminals—for example terminals connected to the PSTN by a cable.

The system may also be implemented in a UMTS (3G network) or any other mobile or cellular telecommunications network—such as a 2G (GSM), 4G (LTE/SAE) or VoIP network—in which at least some of the terminals or units communicate wirelessly with the network.

In an embodiment, the received signal may be decompressed prior to extraction of the watermarks. However, the watermarks may instead be extracted prior to decompression.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of performing a call in a telecommunication system having a plurality of transmitter/receiver units registered with a telecommunications network, the method comprising:
    receiving in the network a first uplink signal representing detected sound from a first originating unit, wherein the first uplink signal includes a first speech component;
    receiving in the network a second uplink signal representing detected sound from a second originating unit, wherein the second uplink signal includes a second speech component;
    encoding said first uplink signal with a first tag corresponding to the first originating unit;
    encoding the second uplink signal with a second tag corresponding to the second originating unit;
    generating a downlink signal by combining the tag-encoded first and second uplink signals, wherein the first and second tags are embedded with the first and second speech components from the first and second uplink signals in a payload of said downlink signal, which payload conveys the detected sound;
    receiving, over a single channel, the downlink signal at a receiving unit; and
    extracting, at the receiving unit, said first and second embedded tags from the downlink signal in order to identify the first speech components from the first originating unit and identify the second speech component from the second originating unit.

2. The method according to claim 1, further comprising:
    producing from said downlink signal a spatially resolved audio signal that presents the first and second speech components as originating from distinct locations in an imaginary spatial orientation around the receiving unit.

3. The method according to claim 2, wherein the spatially resolved audio signal is generated by stereo-panning.

4. The method according to claim 2, wherein the spatially resolved audio signal is generated by two-dimensional or three-dimensional virtualized audio.

5. The method according to claim 2, wherein the spatially resolved audio signal is produced by a stereo sound source at the receiving unit.

6. The method according to claim 1, wherein the first tag and the second tag are watermark tags.

7. The method according to claim 1, wherein the telecommunication system includes three or more of said transmitter/receiver units.

8. The method according to claim 1, wherein the telecommunications network includes a mobile or cellular telecommunications network.

9. The method according to claim 1, wherein the first uplink signal and the second uplink signal are compressed.

10. The method according to claim 1, further comprising: decompressing the downlink signal.

11. The method according to claim 1, wherein at least one of: the first uplink signal, the second uplink or the downlink signal is transmitted in the circuit switched domain.

12. The method according to claim 1, wherein at least one of: the first uplink signal, the second uplink signal or the downlink signal is transmitted in the packet switched domain.

13. A method of performing a call in a telecommunications network, comprising:
    receiving a first uplink signal that includes first speech data from a first terminal registered with the telecommunications network;
    receiving a second uplink signal that includes second speech data from a second terminal registered with the telecommunications network;
    adding a first watermark to the received first speech data from the first terminal to generate watermarked speech data of the first terminal;
    adding a second watermark to the received second speech data from the second terminal to generate watermarked speech data of the second terminal;
    generating a downlink signal for a receiving terminal registered with the network including both the watermarked speech data of the first terminal and the watermarked speech data of the second terminal;
    receiving, over a single channel, the downlink signal at the receiving terminal;
    identifying, from the downlink signal received at the receiving terminal, the watermarked speech data of the first terminal using the first watermark; and
    identifying, from the downlink signal received at the receiving terminal, the watermarked speech data of the second terminal using the second watermark wherein the downlink signal includes a frame comprising a payload, and wherein at least one of the first watermark and the second watermark is embedded in the payload.

14. The method according to claim 13, further comprising:
    producing at the receiving terminal a spatially resolved audio signal in which the uplink speech data from the first terminal and the uplink speech data from the second terminal are reproduced at distinct locations in an imaginary two-dimensional or three-dimensional spatial configuration around the receiving terminal.

15. Apparatus for performing a call in a telecommunication system having a plurality of transmitter/receiver units registered with a telecommunications network, the apparatus comprising:
    a receiver that receives a first uplink signal representing detected sound from a first originating unit and receives a second uplink signal representing detected sound from a second originating unit, wherein the first uplink signal includes a first speech component and the second uplink signal includes a second s speech component;
    at least one tagging processor that encodes the first uplink signal with a first tag that identifies the first speech component corresponding to the first originating unit and encodes the second uplink signal with a second tag that identifies the second speech component corresponding to the second originating unit;
    a signal generator that generates a downlink signal by combining the tag encoded first and second uplink signals, wherein the first and second tags are embedded with the first and second speech components from the first and second uplink signals in a payload of said downlink signal, which payload conveys the detected sound, the embedded tags being extractable from the payload in order to identify the first speech component of the first originating unit and the second speech component of the second originating unit at a receiving terminal that receives the downlink signal over a single channel.

16. The apparatus according to claim 15, wherein said downlink signal enables production of a spatially resolved audio signal that presents the first and second speech components as originating from distinct locations in an imaginary spatial orientation around the receiving unit.

17. The apparatus according to claim 16, wherein the spatially resolved audio signal is generated by stereo-panning.

18. The apparatus according to claim 16, wherein the spatially resolved audio signal is generated by two-dimensional or three-dimensional virtualized audio.

19. The apparatus according to claim 16, wherein the spatially resolved audio signal is produced by a stereo sound source at the receiving terminal.

20. The apparatus according to claim 15, further including the receiving terminal.

21. The apparatus according to claim 15 wherein the at least one tagging processor is at least one watermark processor, and wherein the first tag and the second tag are watermark tags.

22. The apparatus according to claim 15, wherein the telecommunication system includes at least three of said transmitter/receiver units.

23. The apparatus according to claim 15, wherein the telecommunications network includes a mobile or cellular telecommunications network.

24. The apparatus according to claim 15, further comprising:
  a signal compression unit that compresses the first uplink signal and the second uplink signal.

25. The apparatus according to claim 15, wherein at least one of: the first uplink signal, the second uplink signal or the downlink signal is transmitted in the circuit switched domain.

26. The apparatus according to claim 15, wherein at least one of: the first uplink signal, the second uplink signal or the downlink signal is transmitted in the packet switched domain.

27. The apparatus according to claim 15, further including the first originating unit and the second originating unit.

28. An apparatus for performing a conference call in a telecommunications network, comprising:
  a first uplink receiving unit that receives a first uplink signal including first speech data from a first terminal registered with the telecommunications network;
  a second uplink receiving unit that receives a second uplink signal including second speech data from a second terminal registered with the telecommunications network;
  a first watermark unit that adds a first watermark to the received first speech data from the first terminal to generate watermarked speech data of the first terminal;
  a second watermark unit that adds a second watermark to the received second speech data from the second terminal to generate watermarked speech data of the second terminal; and
  a signal generator that generates a downlink signal for a receiving terminal registered with the network, the downlink signal including both the watermarked speech data of the first terminal and the watermarked speech data of the second terminal, wherein the receiving terminal receives the downlink signal over a single channel, and wherein the receiving terminal identifies the first speech data of the first terminal using the first watermark and identifies the second speech data of the second terminal using the second watermark wherein the downlink signal includes a frame including a payload, and wherein at least one of the watermarks is embedded in the payload.

29. The apparatus according to claim 28, wherein said downlink signal enables the production of a spatially resolved audio signal in which the uplink speech data from the first terminal and the uplink speech data from the second terminal are reproduced at distinct locations in an imaginary two-dimensional or three-dimensional spatial configuration around the receiving terminal.

30. The apparatus according to claim 28, further including at least one of: the first and the second terminal.

\* \* \* \* \*